United States Patent
Khanka et al.

(10) Patent No.: US 8,271,000 B1
(45) Date of Patent: Sep. 18, 2012

(54) METHOD, APPARATUS, AND SYSTEM FOR REPEAT PAGING

(75) Inventors: Bhagwan Khanka, Lenexa, KS (US);
Jasinder P. Singh, Olathe, KS (US);
Sachin R. Vargantwar, Overland Park, KS (US); Mark Hanna, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 573 days.

(21) Appl. No.: 12/420,413

(22) Filed: Apr. 8, 2009

(51) Int. Cl.
*H04W 68/00* (2009.01)

(52) U.S. Cl. ........................ 455/458; 455/515

(58) Field of Classification Search ............... 455/426.1, 455/458, 515, 426
See application file for complete search history.

(56) References Cited

U.S. PATENT DOCUMENTS

| | | | | |
|---|---|---|---|---|
| 5,826,173 | A * | 10/1998 | Dent | 340/7.38 |
| 5,862,484 | A * | 1/1999 | Lee | 455/445 |
| 5,918,174 | A * | 6/1999 | Chennakeshu et al. | 455/427 |
| 5,924,042 | A * | 7/1999 | Sakamoto et al. | 455/458 |
| 5,940,431 | A * | 8/1999 | Haartsen et al. | 375/131 |
| 6,678,258 | B1 * | 1/2004 | Capurka et al. | 370/328 |
| 6,823,173 | B2 | 11/2004 | Srey et al. | |
| 7,898,983 | B2 * | 3/2011 | Laroia et al. | 370/254 |
| 7,983,696 | B1 * | 7/2011 | Manghat et al. | 455/458 |
| 2003/0003912 | A1 * | 1/2003 | Melpignano et al. | 455/436 |
| 2003/0152049 | A1 * | 8/2003 | Turner | 370/331 |
| 2005/0186973 | A1 * | 8/2005 | Gaal et al. | 455/458 |
| 2005/0215272 | A1 * | 9/2005 | Helferich | 455/512 |
| 2008/0248817 | A1 * | 10/2008 | Gao et al. | 455/458 |
| 2009/0017845 | A1 * | 1/2009 | Wu et al. | 455/458 |

FOREIGN PATENT DOCUMENTS

WO    WO 01/10146    2/2001

* cited by examiner

*Primary Examiner* — Erika Gary
*Assistant Examiner* — Marisol Fahnert (57) ABSTRACT

Disclosed herein is a method for repeat paging in a wireless communication system. In accordance with the method, a RAN controller will send a repeat-paging directive to a plurality of BTSs to cause each BTS to begin broadcast of a series of page messages destined to a target mobile station. While transmitting the series, one of the BTSs will then receive from the mobile station a page response, and the BTS will responsively provide to the RAN controller a notification of the page response. In response to receipt of the notification, the RAN controller will then send a paging-stop directive to at least each other BTS of the plurality, and each BTS that receives the paging-stop directive will responsively discontinue broadcasting the series of page messages before completing broadcast of the entire series of page messages, thereby helping to conserve air interface resources.

20 Claims, 4 Drawing Sheets

METHOD, APPARATUS, AND SYSTEM FOR REPEAT PAGING

BACKGROUND

In a typical cellular radio access network (RAN), an area is divided geographically into a number of coverage areas (namely, cells and cell sectors) defined by radio frequency (RF) radiation patterns from base transceiver stations (BTSs). All of the BTSs in a region may then be communicatively linked with a common RAN controller that manages certain operations of the BTSs and that may function as an aggregation point for communications passing through the BTSs.

For instance, a cellular service provider's market may be divided into local regions each containing a number of BTSs that are communicatively linked with a common base station controller (BSC) that manages the BTSs and that functions as an aggregation point and RAN controller. Further, the BSCs of various local regions may then be coupled with a common switch or gateway, such as a mobile switching center (MSC) or packet data serving node (PDSN), that functions as a broader aggregation point and a broader RAN controller, and that may provide connectivity with a transport network such as the public switched telephone network (PSTN) or the Internet. Other examples are possible as well.

When a mobile station (such as a cellular telephone, pager, or appropriately equipped portable computer, for instance) is positioned in a coverage area of such a system, the mobile station communicates via an RF air interface with the BTS antennas that radiate to define the coverage area. Consequently, a communication path may be established between the mobile station and the transport network, via the air interface, the BTS, the BSC and the switch or gateway.

In practice, communications over the air interface between a BTS (base station) and a mobile station will comply with a defined air interface protocol or "access technology." Numerous such protocols are well known in the art, and others will be developed in the future. Examples of existing protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth.

In general, when RAN controller (e.g., MSC and/or BSC) encounters a trigger event that indicates a need to transmit information to a given mobile station, RAN controller may cause multiple BTSs to page the mobile station. For instance, the RAN controller may initiate paging in the coverage area where the mobile station was last registered and in various coverage areas surrounding that coverage area, out to a particular radius defining a paging area. If the mobile station responds to the page, then the RAN controller would thereby learn the coverage area in which the mobile station is currently operating, and the RAN controller may arrange for transmission of the information to the mobile station in that coverage area.

In each wireless coverage area, the air interface defined by the serving BTS may be divided into various discrete channels by applying one or more mechanisms, such as unique spread-spectrum coding, time division multiplexing, and/or frequency differentiation, for instance. One or more of the channels in each coverage area may be reserved for use as a paging channel, on which the BTS may broadcast page messages destined to particular mobile stations. And one or more of the channels in each coverage area may be reserved for use as an access channel, on which mobile stations may transmit page response messages to the RAN. In practice, when a BTS receives from a RAN controller a directive to page a mobile station, the BTS may thus responsively broadcast on the paging channel a page message directed to that mobile station. If and when the mobile station receives the page message, the mobile station may then programmatically transmit a page response message to the RAN on the access channel.

OVERVIEW

When a RAN controller directs a group of BTSs to page a mobile station, the RAN controller may wait for notification of page response message from the mobile station. If the RAN controller does not receive notification of a page response message within a predefined time period, the RAN controller may then direct the BTSs (or some other set of BTSs—possibly covering a larger area) to page the mobile station, and the RAN controller may again wait for notification of a page response. The RAN controller may repeat this process a predefined number of times, before the RAN controller concludes that the mobile station could not be found and declares the paging effort to have failed.

The time period between successive page attempts like this may be based in part on how often the target mobile station is set to scan the paging channel in search of a page message. In particular, a mobile station may be programmed to operate at a defined "slot cycle" that indicates how often the mobile station will scan a timeslot of the paging channel to determine if the timeslot contains a page message for the mobile station. When a RAN sends successive page messages (e.g., page attempts) to a mobile station, the RAN will optimally do so in timeslots that the mobile station is set to scan. For instance, if the mobile station is set to operate at a slot cycle of 1.28 seconds, then the RAN may wait an interval of 1.28 seconds between successive page message transmissions to the mobile station, or the RAN may wait an interval that is a multiple of 1.28 seconds (e.g., 2.56 seconds, 5.12 seconds, or 10.24 seconds) between successive page message transmissions to the mobile station.

For certain types of communications, the amount of time that it takes to successfully page a mobile station is not critical. However, for other types of communications, the paging time is more significant. For instance, when setting up a "push-to-talk" (PTT) session or other such latency-sensitive communication to a mobile station, it would be best to minimize the time that it takes to successfully page the mobile station. One way to help do so is to minimize the time interval between successive page attempts to the mobile station. For instance, when a mobile station is in a PTT mode, the mobile station may be set to operate at a shorter paging slot cycle, such as 213 milliseconds.

If a RAN controller were to repeatedly send page messages to a mobile station at such a short slot cycle, the resulting backhaul traffic between the RAN controller and each BTS to which the RAN controller sends each successive page message could be extreme. To avoid overwhelming the backhaul channels with such traffic, particularly for short slot cycles, one solution is for the RAN to simply send a quick-repeat paging directive respectively to each applicable BTS, directing the BTS to engage in repeated paging of the mobile station. Such a directive may inform the BTS how many times the BTS should page the mobile station and how much time the BTS should wait between successive pages. Alternatively, each BTS could have default settings (e.g., number of attempts and time interval between attempts) for such a quick-repeat feature, in which case the quick-repeat directive could simply direct the BTSs to initiate the process with those settings.

In response to a quick-repeat directive from the RAN controller, each BTS may then broadcast a series of page messages to the mobile station, with the appropriate interval between successive page message transmissions. By way of example, for a target mobile station operating at a slot cycle of 213 milliseconds, the quick-repeat paging directive to the group of BTSs may cause each BTS to transmit the page message 120 times with an interval of 213 milliseconds between each successive transmission.

In a system where the RAN controller itself sends each successive page message via one or more BTSs to the target mobile station, the RAN controller may discontinue transmission of the page messages once the RAN controller receives a page response from the mobile station.

Unfortunately, however, in a system where the RAN controller sends quick-repeat page directives to multiple BTSs, each BTS would responsively carry out the quick-repeat page directive by rote, transmitting the page message the designated number of times with the designated interval between each successive transmission. During the course of such transmissions, if the mobile station successfully receives the page message in the coverage area of a given BTS and transmits a page response message via that BTS to the RAN controller, the BTS through which that page response message passed might recognize the page response and therefore discontinue the repeat-paging transmission. However, notwithstanding the fact that the mobile station already responded to the page, each other BTS that received the quick-repeat paging directive from the RAN controller would blindly continue the repeat transmissions pursuant to the directive, until the BTS completes the designated number of repeat transmissions.

One problem with continuing the repeat-page transmission like this after the mobile station has already responded to the page in a given coverage area is that the continued page transmissions in the remaining coverage areas will unnecessarily burden the paging channel in those other coverage areas.

Disclosed herein is a method for paging in a manner that helps overcome this problem. In accordance with the method, a RAN controller will send a repeat-paging directive to a plurality of BTSs to cause each BTS to begin broadcast of a series of page messages destined to a target mobile station. While transmitting the series, one of the BTSs will then receive from the mobile station a page response, and the BTS will responsively provide to the RAN controller a notification of the page response (e.g., the page response itself). In response to receipt of the notification, the RAN controller will then send a paging-stop directive to at least each other BTS of the plurality, and each BTS that receives the paging-stop directive will responsively discontinue broadcasting the series of page messages before completing broadcast of the entire series of page messages.

In practice, the RAN controller may generate and transmit the paging-stop directive immediately upon receipt of the notification. Alternatively, the method could be arranged such that each BTS will query the RAN controller before each repeat page transmission, to find out whether to continue the repeat-paging. In such an arrangement, the RAN controller may maintain in data storage a flag indicating whether the RAN controller has yet received a page response from the mobile station. Each time the RAN controller receives a query from a BTS, seeking to determine whether to continue repeat-paging, the RAN controller may then check that flag and respond accordingly. Thus, if the RAN controller has received a page-response from the mobile station, the RAN controller would respond to the query by sending the paging-stop directive to the querying BTS. Whereas, if the RAN controller has not yet received a page-response fro the mobile station, the RAN controller would not send the paging-stop directive to the querying BTS in response to the query (but may instead disregard the query or respond to the query with a directive to continue the repeat-paging).

Advantageously with this process, once the mobile station successfully receives the page message and responds in a given BTS coverage area, at least each other BTS that had been directed to repeat-page the mobile station will be made to stop the repeat paging, thus helping to conserve air interface resources.

These as well as other aspects and advantages will become apparent to those of ordinary skill in the art by reading the following detailed description, with reference where appropriate to the accompanying drawings.

DETAILED DESCRIPTION

Referring to the drawings, as noted above, FIG. 1 is a simplified block diagram of a cellular communication system in which the method, apparatus, and system can be implemented. As shown, the communication system includes at its core a radio access network (RAN) 12, which functions to provide mobile stations with cellular wireless communication service, such as connectivity with a transport network 14 for instance. In general, the RAN includes a RAN controller 16 and multiple base transceiver stations (BTSs), three examples of which 18, 20, 22 are shown in the figure.

Figure 1:
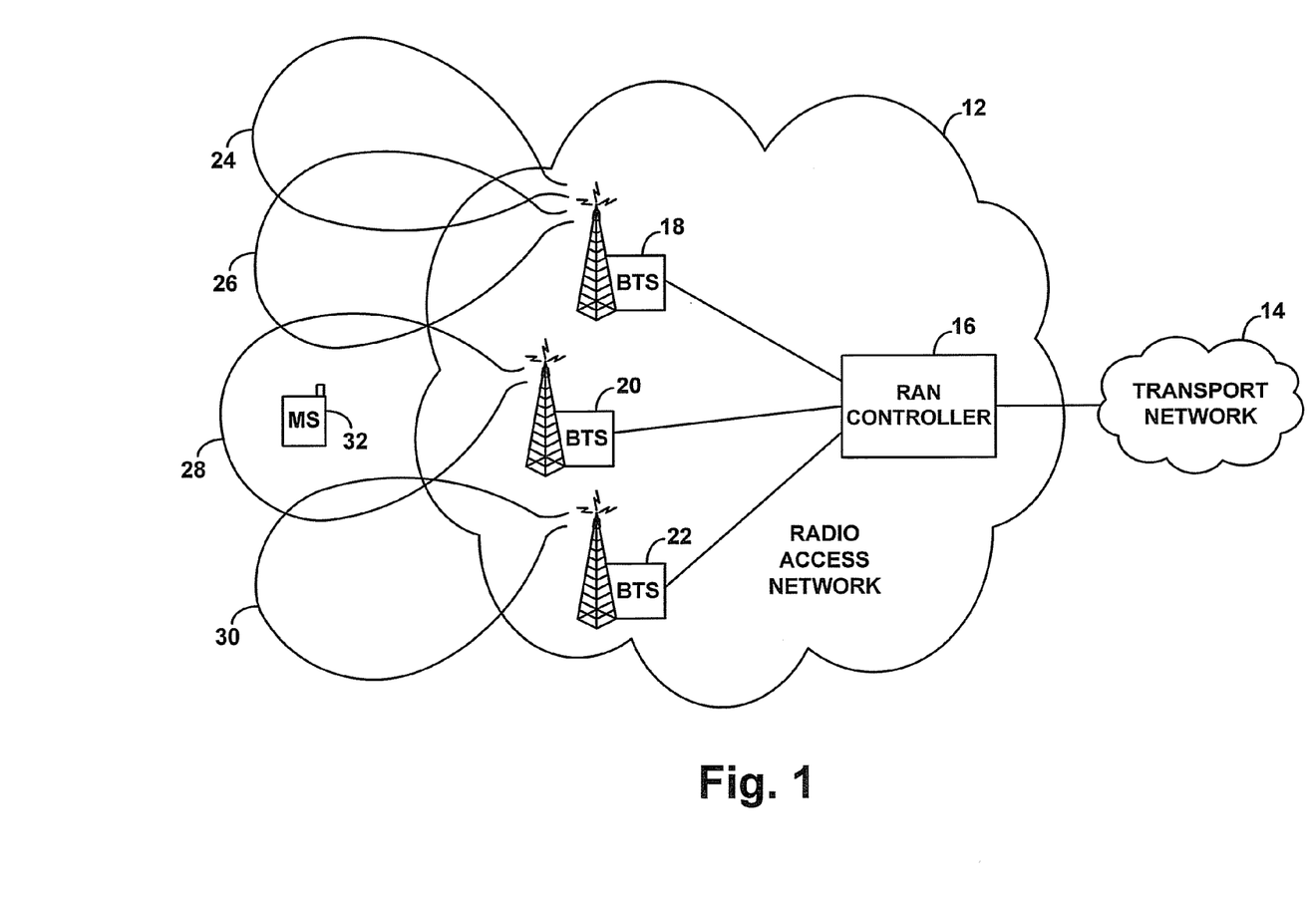
FIG. 1 is a simplified block diagram of a cellular wireless communication system in which the present method, apparatus, and system can be implemented.

Each BTS preferably includes transceiver equipment and antennas (e.g., on an antenna tower) arranged to define one or more cellular wireless coverage areas such as a cell and cell sectors. For instance, BTS 18 is shown radiating to define representative coverage areas 24, 26, BTS 20 is shown radiating to define a representative coverage area 28, and BTS 22 is shown radiating to define a representative coverage area 30. Shown operating within coverage area 28 is then a representative mobile station 32, which can be any type of wireless communication device capable of engaging in air interface communication with the BTS.

Preferably, the air interface of each coverage area will define various channels, including but not limited to at least one paging channel through which the BTS can broadcast page messages destined for receipt by target mobile stations and at least one access channel through which mobile stations can send page response messages to the BTS. These channels may be defined in accordance with an agreed air interface communication protocol, such as one of those noted above for instance, and both the BTS and mobile station should be arranged to communicate in accordance with the agreed protocol. By way of example and without limitation, the channels may be defined in accordance with a CDMA protocol, such as 1xEV-DO (IS-856) for instance.

RAN controller 16 preferably functions to manage certain aspects of the RAN operation, such as certain BTS functions and features of air interface communication, and may also serve as an aggregation point for communications passing through the various BTSs. As noted above, the RAN controller can take various forms. For instance, the RAN controller can be a base station controller (BSC) that controls a number of BTSs and manages functions such as handoff of mobile stations between BTS coverage areas within its control, and that serves as an aggregation point for communications passing through the BTSs in its control. Alternatively, the RAN controller can be a mobile switching center (MSC) that provides broader control over RAN operation and functions as an aggregation point for communications passing through a number of BSCs.

Figure 2:
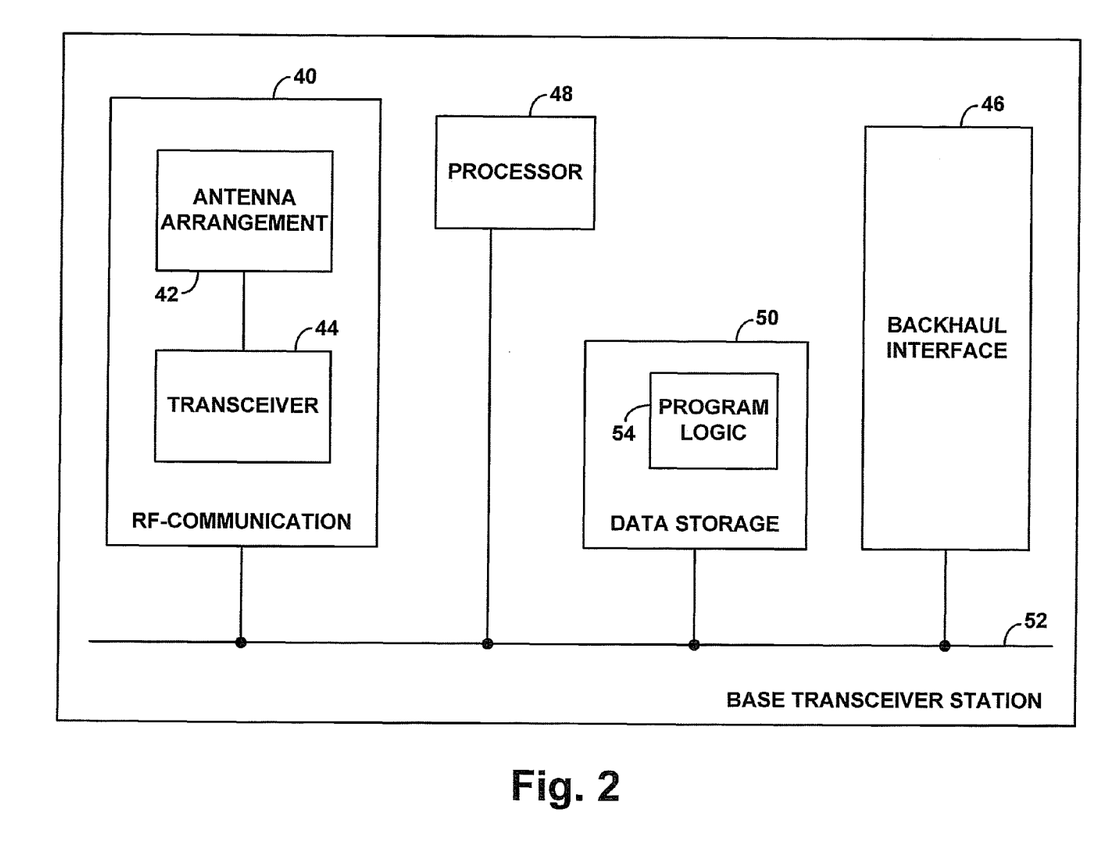
FIG. 2 is a simplified block diagram of a representative BTS operable within the system of FIG. 1.

FIG. 2 is a simplified block diagram of a BTS, showing some of the functional components that each BTS may include in the arrangement of FIG. 1. As shown, the BTS includes for each of its one or more coverage areas an RF communication block 40 comprising a respective antenna arrangement 42 and transceiver 44, and a backhaul interface 46, a processor 48, and data storage 50, all of which may be communicatively linked together by a system bus, network, or other connection mechanism 52.

Antenna arrangement 42 may comprise one or more antennas arranged in a manner now known or later developed for radiating to define a wireless coverage area. Typically, the antenna arrangement would be mounted at the top of an antenna tower. But the antenna arrangement can be provided in some other manner or location. Transceiver 44, in turn, preferably comprises a power amplifier, modem chipset, channel cards, and other circuitry for sending and receiving communications via the antenna arrangement 42 in accordance with the agreed air interface protocol.

Backhaul interface 46 comprises a mechanism for communicatively linking with RAN controller 16, such as to facilitate communication of control signaling and user traffic between the BTS and the RAN controller. The link between the BTS backhaul interface 46 and the RAN controller may be a direct link, such as a T1 line or a wireless backhaul link, or the link may include one or more other intermediate nodes. For instance, if the RAN controller is an MSC, a BSC may sit in the communication path between the BTS and the RAN controller. In any event, the backhaul interface 46 may take whatever form is necessary to couple with the communication link to the RAN controller.

Processor 48 may comprise one or more general purposes processors (e.g., INTEL microprocessors) and/or one or more special purpose processors (e.g., dedicated digital signal processors or application specific integrated circuits). If the processor comprises multiple processors, the processors could work separately or in combination (e.g. in parallel). Further, the functions of processor 48 could be integrated in whole or in part with transceiver 44 or with one or more other aspects of the BTS.

Data storage 50, in turn, comprises one or more volatile and/or non-volatile storage components, such as magnetic, optical, or organic storage components, which can be integrated in whole or in part with processor 48. As shown, data storage 50 may contain program logic 54, which can be executed by processor 48 to carry out certain BTS functions described in this document. For instance, the program logic 54 may be executable to receive a repeat-paging directive from the RAN controller 16 and to responsively begin to broadcast a series of page messages destined to a target mobile station, and upon receipt from the mobile station of a response to one of the page messages, to send to the RAN controller a notification of the received response (e.g., the received response itself). Further, the logic may be executable to receive from the RAN controller a paging-stop directive before the BTS has finished broadcasting the entire series of page messages, and to responsively discontinue broadcast of the series of page messages.

Figure 3:
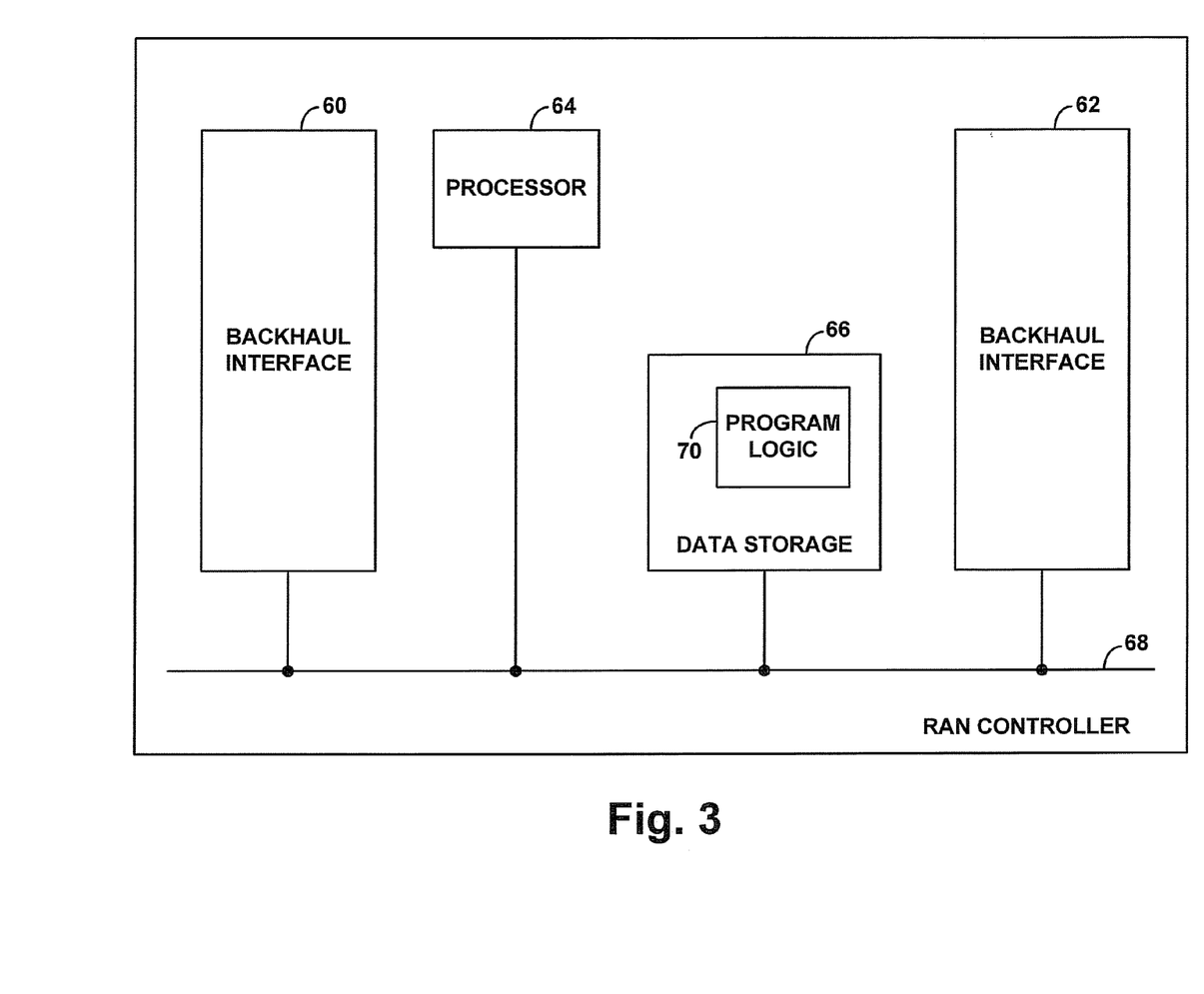
FIG. 3 is a simplified block diagram of a representative RAN controller operable within the system of FIG. 1.

FIG. 3 is next a simplified block diagram of RAN controller 16, showing some of the functional components that the RAN controller may include in the arrangement of FIG. 1. As shown, the RAN controller may include a first backhaul interface 60, a second backhaul interface 62, a processor 64, and data storage 66, all of which may be communicatively linked together by a system bus, network, or other connection mechanism 68.

The first backhaul interface 60 functions to provide direct or indirect connectivity with the various BTSs and particularly with the backhaul interface 46 of each BTS, so as to facilitate communication of control signaling and user traffic between the RAN controller and each BTS. As with the BTS backhaul interface 46, the first backhaul interface 60 of the RAN controller may be arranged for wired and/or wireless backhaul communication and may take various forms depending on the links that connect the RAN controller with each BTS.

The second backhaul interface 62 functions to provide connectivity with other RAN elements and/or with transport network 14. For instance, if the RAN controller is a BSC, the second backhaul interface 62 may connect with a link to an MSC or PDSN that in turn provides connectivity with the transport network. Alternatively, if the RAN controller is an MSC, the second backhaul interface 62 may simply provide connectivity with the PSTN. Other examples are possible as well.

As with the BTS processor, processor 64 may comprise one or more general purposes processors and/or one or more special purpose processors. Data storage 66, in turn, comprises one or more volatile and/or non-volatile storage components, such as magnetic, optical, or organic storage components, which can be integrated in whole or in part with processor 64. As shown, data storage 66 may contain program logic 70, which can be executed by processor 64 to carry out various RAN-controller functions described in this document.

For instance, the program logic 70 may be executable to detect a trigger for paging mobile station 32 and to responsively generate and send to BTSs 18, 20, 22 (defining a relevant paging zone for example) a repeat-paging directive, instructing each BTS to initiate quick-repeat paging of the mobile station. Further, logic may be executable to receive from one of the BTSs a notification that the BTS received a page response from the mobile station, and to responsively send to at least each other BTS a paging-stop directive that causes each BTS that receives the paging-stop directive to discontinue broadcasting the series of page messages before completing broadcast of the entire series of page messages. Still further, the logic may be executable to maintain in data storage 66 a flag that indicates whether the target mobile station has responded to the page effort, and to refer to that flag as a basis to decide whether a BTS should continue repeat-paging.

Figure 4:
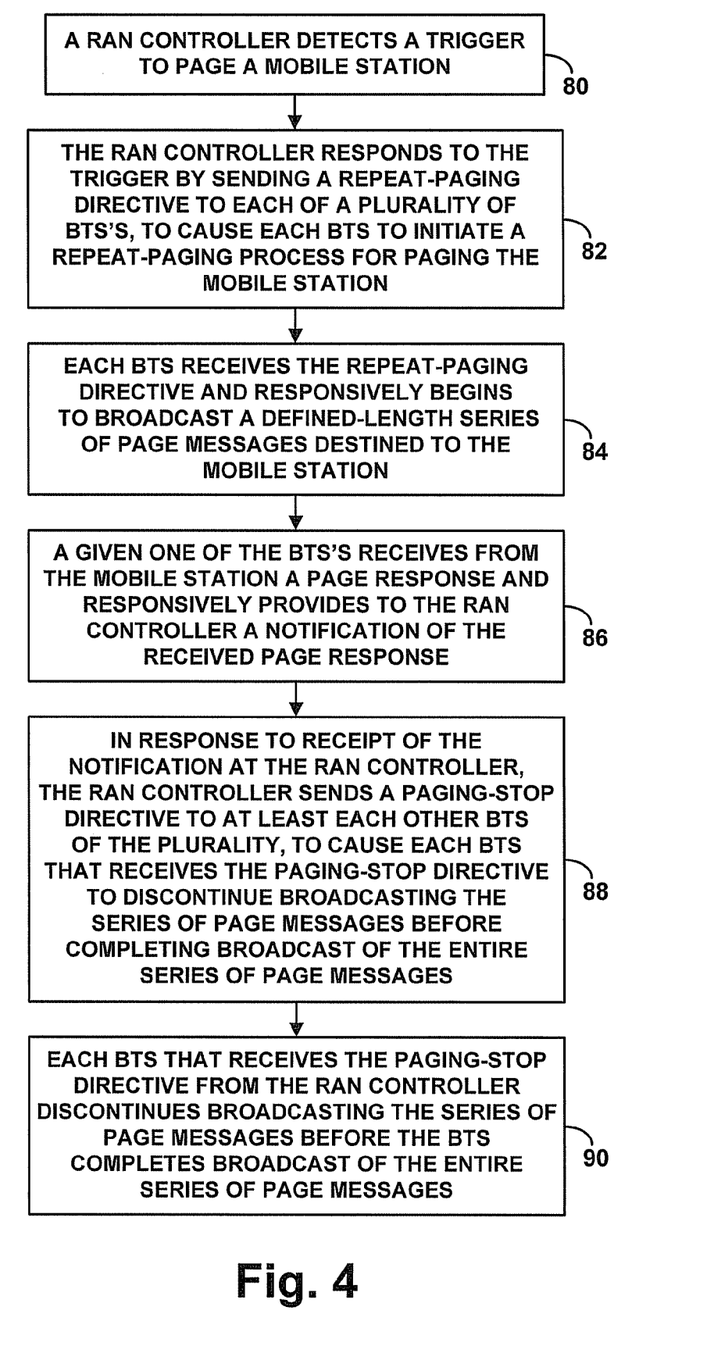
FIG. 4 is a flow chart depicting functions that can be carried out in accordance with an embodiment of the method.

FIG. 4 is next a flow chart depicting functions that can be implemented in accordance with the present method, such as by RAN controller 16 or a combination of RAN controller 16 and BTSs 18, 20, 22.

As shown in FIG. 4, at block 80, the method involves the RAN controller detecting a paging trigger for paging mobile station 32. Detecting the paging trigger can take various forms. For instance, if the RAN controller is an MSC, detecting the paging trigger may involve receiving a call setup signaling message indicating that a call is to be set up to the mobile station. Or if the RAN controller is a BSC, detecting the paging trigger may involve receiving a page-directive signal from an MSC or PDSN, or receiving from an MSC or PDSN either user data or a signal otherwise indicating that a need exists to page the mobile station. Still alternatively, the function of detecting the paging trigger could involve simply determining that a next attempt at paging is required, such as after a first failed paging attempt or the like. Other examples are possible as well.

At block 82, the RAN controller then responds to the paging trigger by sending a repeat-paging directive to each of the BTSs 18, 20, 22 in a relevant paging zone, to cause each BTS to initiate a repeat-paging process for paging the mobile station. The repeat-paging directive can be sent as a message in largely the same way that a RAN controller today would send a paging directive or other signaling message to a BTS. To direct initiation of repeat-paging specifically, the repeat-paging directive may include a tag or code designating it as a repeat-paging directive and may further carry data that specifies a desired number of page-transmissions and a time period between each page-transmission (preferably consistent with the mobile station's slot cycle). Alternatively, the repeat-paging directive might not specify such parameters, and each recipient BTS may apply default parameters or parameters determined in some other manner.

At block 84, each BTS then receives the repeat-paging directive and responsively begins to broadcast a series of page messages destined to the mobile station. This series of page messages extends from a first page message of the series to a last page message of the series, and includes a total number of page messages, as specified by the repeat-paging directive for instance. The page messages of the series may be identical in content, each including data that identifies the target mobile station and perhaps other data identifying a type of page message. Alternatively, there could be some variation in the various page messages, such as a successively incrementing counter or other data. The BTS may transmit each page message of the series by outputting the page message on an air interface paging channel respectively in each of one or more coverage areas defined by the BTS. (In one embodiment, the paging directive may specify one or more particular coverage areas (e.g., sectors) of the BTS in which the paging is to occur; in other embodiments, the paging directive may cause paging to occur generally for the BTS.)

Thus, at this point, automatic repeat-paging of the mobile station would commence in a plurality of wireless coverage areas, from a plurality of BTSs.

At block 86, a given one of the BTSs would then receive from the mobile station a response to one of the page messages and would responsively provide to the RAN controller a notification of the received page response. In the arrangement of FIG. 1, we can assume that BTS 20 would be the one that receives the page response from the mobile station, as the mobile station happens to be operating in the coverage area defined by that BTS. Thus, upon receipt of that page response, BTS 20 would send to RAN controller a notification of the page response.

In practice, the notification from the BTS to the RAN controller can be the received page response itself. Alternatively, the notification can take some other form. In either case, the RAN controller thereby determines where the mobile station is located and, if appropriate, can initiate a next process of directing setup of an air interface traffic channel through which the mobile station can receive information such as a call. The act of sending the notification from the BTS to the RAN controller can occur in largely the same manner that page responses are known to be sent to a RAN controller (e.g., BSC or MSC) when received by a BTS.

At block 88, in response to receipt of the notification at the RAN controller, the RAN controller then sends a paging-stop directive to at least each other BTS of the plurality, to cause each BTS that receives the paging-stop directive to discontinue broadcasting the series of page messages before completing broadcast of the entire series of page messages, i.e., before sending the last page message of the predefined series. In practice, the RAN controller can send the paging-stop directive to all of the BTSs that the RAN controller had instructed to carry out repeat-paging of the mobile station, including the BTS that notified the RAN controller of receipt of the page response. Alternatively, the BTS that received the page response may itself programmatically stop repeat-paging of the mobile station upon receipt of a page-response from the mobile station, and so the RAN controller may forego instructing that BTS to stop the repeat-paging.

Transmission of the paging-stop directive from the RAN controller to each BTS may occur in largely the same manner that the RAN controller sent the repeat-paging directive to the BTS, preferably in a newly defined message along the backhaul link between the RAN controller and the BTS. The paging-stop directive may include a tag or code that designates the message as a paging-stop directive and would preferably designate the page effort at issue, such as the target mobile station, so that the BTS would know which of possibly multiple repeat-paging processes to discontinue.

At block 90, each BTS that receives the paging-stop directive from the RAN controller will discontinue broadcasting the series of page messages before the BTS completes broadcast of the entire series of page messages.

By way of example, assume that the repeat-paging process would have each BTS transmit a series of 120 page messages at a slot cycle of 213 ms. Assume next that BTS 20 receives a page response from the mobile station after its third page transmission of the series. BTS 20 would then responsively provide a notification of the page response to RAN controller 16. In response, RAN controller 16 would then send a paging-stop directive to at least BTS 18 and BTS 22, directing each of those BTSs to discontinue the repeat-paging process. With signaling delay, if we assume BTSs 18, 22 each receive the paging-stop directive after its fifth page transmission of the series. At that point, BTSs 18, 22 would each discontinue the repeat-paging process, thus advantageously avoiding transmission of the remaining 115 page messages in their respective coverage areas, and thus helping to conserve air interface resources.

While the preferred embodiment would have RAN controller send a paging-stop directive to each other BTS immediately upon receipt of the page response notification from the BTS that received the page response, an alternative embodiment may provide for a query-response process to trigger transmission of the paging-stop directive. In this alternative embodiment, each of the BTSs that receives a repeat-paging directive from the RAN controller will broadcast the first page message of the series and then will then query the RAN controller to determine whether to continue before sending each subsequent page message of the series.

In particular, before broadcasting each page message of the series following the initial page message of the series, the BTS will send a query to the RAN controller to determine whether to continue or discontinue broadcast of the series of page messages. At that point, if the RAN controller has received a notification of a page response from the target mobile station, then the RAN controller would respond to the query by sending a paging-stop directive to the querying BTS, so as to stop the repeat-paging process by that BTS. Whereas, if the RAN controller has not yet received notification of a page response from the target mobile station, then the RAN controller would not send a paging-stop directive in response to the query but may instead send a repeat-paging-continue directive or simply not respond, thus causing the repeat-paging process by that BTS to continue. The signaling between a querying BTS and the RAN controller for this purpose can occur in largely the same manner that paging directives and page responses/notifications are communicated between such entities, albeit with newly defined signaling messages.

To facilitate this query-response process, the RAN controller may maintain a flag (e.g., Boolean value or other data) in data storage 66 indicating whether repeat-paging should continue. When the RAN controller initially sends the repeat-paging directive to the BTSs, the RAN controller would set that flag to a state indicating that repeat-paging should continue. In turn, when the RAN controller receives the notification of page response from the target mobile station, the RAN controller would set the flag to a state that indicates repeat-paging should not continue.

Various embodiments have been described above. Those of ordinary skill level in this technology area will appreciate, however, that numerous changes can be made without deviating from the basic principles of the invention.

We claim:

1. A paging system comprising:
a radio access network controller (RAN controller); and
a plurality of base transceiver stations (BTSs) communicatively linked with the RAN controller, each BTS radiating to define at least one respective wireless coverage area for serving mobile stations,
wherein the RAN controller detects a paging trigger for paging a mobile station and responsively sends a repeat-paging directive to each BTS to cause each BTS to repeatedly page the mobile station,
wherein each BTS is arranged to (i) receive the repeat-paging directive and responsively begin broadcasting a series of page messages destined to the mobile station and (ii) upon receipt from the mobile station of a response to one of the page messages, provide to the RAN controller a notification of the received response,
wherein, in response to receipt of the notification from a given BTS, the RAN controller sends a paging-stop directive to at least each other BTS of the plurality, wherein the paging-stop directive causes each BTS that receives the paging-stop directive to discontinue broadcasting the series of page messages before completing broadcast of the entire series of page messages,
wherein, upon receipt of the repeat-paging directive, each BTS of the plurality broadcasts a first page message and, respectively before broadcasting each page message of the series following an initial page message of the series, sends a query to the RAN controller to determine whether to continue or discontinue broadcast of the series,
wherein if the RAN controller has received the notification, the RAN controller sends the paging-stop directive to the BTS in response to the query, and
wherein if the RAN controller has not received the notification, the RAN controller does not send the paging-stop directive to the BTS in response to the query.

2. The paging system of claim 1, wherein the series of page messages consists of a defined number of page messages, and wherein broadcasting the series of page messages comprises broadcasting page messages of the series with a defined interval of time between broadcast of successive page messages of the series.

3. The paging system of claim 2, wherein the repeat-paging directive specifies the number of page messages and the interval of time.

4. The paging system of claim 1, wherein broadcasting the series of page messages comprises broadcasting each page message of the series on at least one air interface paging channel.

5. The paging system of claim 4, wherein the at least one paging channel is defined in accordance with an IS-856 air interface protocol.

6. The paging system of claim 4, wherein the at least one paging channel is defined in accordance with a Code Division Multiple Access (CDMA) air interface protocol.

7. The paging system of claim 1, wherein when the given BTS receives from the mobile station a response to one of the page messages, the given BTS itself discontinues broadcast of the series of page messages.

8. The paging system of claim 1,
wherein the RAN controller maintains in data storage a flag indicating whether repeated paging should continue and wherein the RAN controller refers to the flag upon receipt of the query,
wherein, upon sending the repeat-paging directive, the flag has a state indicating that repeated paging should continue, and
wherein, upon receipt of the notification, the RAN controller sets the flag to a state indicating that repeated paging should not continue.

9. The paging system of claim 1, wherein the RAN controller detects the paging trigger by receiving a signal indicative of a call to be set up to the mobile station or by receiving packet-data to be transmitted via an air interface traffic channel to the mobile station.

10. The paging system of claim 1, wherein the RAN controller comprises at least one of (i) a base station controller and (ii) a mobile switching center.

11. A radio access network controller (RAN controller) comprising:
a communication interface through which the RAN controller communicates with a plurality of base transceiver stations (BTSs), wherein each BTS radiates to define at least one respective wireless coverage area for serving mobile stations;
a processor;
data storage;
paging-initiation logic stored in the data storage and executable by the processor to detect a paging trigger for paging a mobile station and to responsively send a repeat-paging directive to each BTS to cause each BTS to begin broadcast of a series of page messages destined for the mobile station;
paging-discontinuation logic stored in the data storage and executable by the processor (i) to receive from a given one of the BTSs a notification indicating that the given BTS received from the mobile station a response to one of the page messages and (ii) responsive to the notification, to send to at least each other BTS a paging-stop directive, wherein the paging-stop directive causes each BTS that receives the paging-stop directive to discontinue broadcasting the series of page messages before completing broadcast of the entire series of page messages, wherein, from each BTS, the RAN controller receives a query before the BTS broadcasts each page message of the series following an initial page message of the series, wherein, if the RAN controller has received the notification, the RAN controller sends the paging-stop directive to the BTS in response to the query, and wherein if the RAN controller has not received the notification, the RAN controller does not send the paging-stop directive to the BTS in response to the query.

12. The RAN controller of claim 11, wherein the series of page messages consists of a defined number of page messages with a defined time interval between broadcast of successive page messages of the series.

13. The RAN controller of claim 12, wherein the repeat-paging directive specifies the number of page messages and the time interval.

14. The RAN controller of claim 11, wherein the RAN controller maintains in data storage a flag indicating whether repeated paging should continue, and wherein the RAN controller refers to the flag upon receipt of the query, wherein, upon sending the repeat-paging directive, the flag has a state indicating that repeated paging should continue, and wherein, upon receipt of the notification, the RAN controller sets the flag to a state indicating that repeated paging should not continue.

15. In a cellular radio access network (RAN) of a type comprising a RAN controller and a plurality of base transceiver stations (BTSs), wherein each BTS radiates to define at least one respective wireless coverage area for serving mobile stations, and wherein the RAN controller is communicatively linked with the BTSs, a paging method comprising:

detecting at the RAN controller a paging trigger for paging a mobile station;

responsive to the paging trigger, sending a repeat-paging directive from the RAN controller to each BTS to cause each BTS to page the mobile station;

at each BTS, receiving the repeat-paging directive and responsively beginning to broadcast a series of page messages destined to the mobile station;

at each BTS, respectively before broadcast of each page message of the series following an initial page message of the series, sending a query to the RAN controller to determine whether to broadcast the page message;

maintaining in data storage at the RAN controller a flag indicating whether repeated paging should continue, wherein, upon sending the paging directive, the flag has a state indicating that repeated paging should continue;

a given one of the BTSs receiving from the mobile station a response to one of the page messages and responsively providing to the RAN controller a notification of the received response;

responsive to receipt of the notification at the RAN controller, setting the flag to a state indicating that repeated paging should not continue;

upon receipt of each query at the RAN controller, referring to the flag to determine whether the querying BTS should broadcast a next page message and (i) if the flag has a state indicating that repeated paging should continue, sending a paging-stop directive to the querying BTS in response to the query, wherein the paging-stop directive causes the querying BTS to discontinue broadcasting the series of page messages before completing broadcast of the entire series of page messages but (ii) if the flag has a state indicating that repeated paging should not continue, not sending the paging-stop directive to the querying BTS in response to the query.

16. The paging method of claim 15, wherein the series of page messages consists of a defined number of page messages with a defined time interval between broadcast of successive page messages of the series.

17. The paging method of claim 15, wherein the series of page messages consists of a defined number of page messages, and wherein broadcasting the series of page messages comprises broadcasting page messages of the series with a defined interval of time between broadcast of successive page messages of the series.

18. The paging method of claim 17, wherein the repeat-paging directive specifies the number of page messages and the interval of time.

19. The paging method of claim 15, wherein broadcasting the series of page messages comprises broadcasting each page message of the series on at least one air interface paging channel.

20. The paging method of claim 15, further comprising, when the given BTS receives from the mobile station a response to one of the page messages, the given BTS itself discontinuing broadcast of the series of page messages if broadcast of the series if not yet complete.

* * * * *